(12) United States Patent
Kamiya

(10) Patent No.: US 6,531,901 B2
(45) Date of Patent: *Mar. 11, 2003

(54) HIGH-SPEED BUS CAPABLE OF EFFECTIVELY SUPPRESSING A NOISE ON A BUS LINE

(75) Inventor: Hiroshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/814,982

(22) Filed: Mar. 23, 2001

(65) Prior Publication Data

US 2001/0010470 A1 Aug. 2, 2001

Related U.S. Application Data

(63) Continuation of application No. 09/129,641, filed on Aug. 5, 1998, now Pat. No. 6,265,912.

(30) Foreign Application Priority Data

Aug. 6, 1997 (JP) ............................. 9-211854
Sep. 3, 1997 (JP) ............................. 9-238605
Sep. 3, 1997 (JP) ............................. 9-238650

(51) Int. Cl.[7] ............................. H03B 1/00; H03L 5/00
(52) U.S. Cl. .................. 327/108; 319/427; 319/170; 326/30; 326/86
(58) Field of Search .................. 327/108, 319, 327/427, 170; 326/30, 21, 86

(56) References Cited

U.S. PATENT DOCUMENTS 4,320,521 A   3/1982  Balakrishnan et al. ...... 327/170
5,548,226 A   8/1996  Takekuma et al. ............. 326/30
5,568,063 A  10/1996  Takekuma et al. ............. 326/30
5,589,789 A  12/1996  Kamiya ....................... 327/108
5,627,481 A   5/1997  Takekuma et al. ............. 326/30
5,666,834 A   9/1997  Takekuma et al. ............. 326/30
5,767,695 A   6/1998  Takekuma et al. ............. 326/30
5,818,253 A  10/1998  Takekuma et al. ............. 326/30
5,821,767 A * 10/1998  Osaka et al. .................. 326/30
6,144,168 A * 11/2000  Kern .......................... 315/219
6,265,912 B1 * 7/2001  Kamiya ....................... 327/108

FOREIGN PATENT DOCUMENTS

JP   5-119882    5/1993
JP   6-35582     2/1994
JP   7-202947    8/1995
JP   8-18583     1/1996
JP   8-286793   11/1996

* cited by examiner

Primary Examiner—Dinh T. Le
(74) Attorney, Agent, or Firm—Foley & Lardner

(57) ABSTRACT

A high-speed bus includes a bus line to be connected with a bus driver and a bus receiver. Pull-up resistors are connected to both ends of the bus line for feeding a given pull-up electric potential thereto. A series resistor is further connected between the bus line and each of the bus driver and the bus receiver. The bus driver includes a series resistor and a capacitive component which are connected in series between the bus line and the ground. The bus receiver includes a waveform shaping component connected to the bus line for shaping a waveform of an inputted signal, and a receiver circuit receiving as an input thereof an output of the waveform shaping component.

4 Claims, 7 Drawing Sheets

HIGH-SPEED BUS CAPABLE OF EFFECTIVELY SUPPRESSING A NOISE ON A BUS LINE

This is a Continuation Application of application Ser. No. 09/129,641, filed Aug. 5, 1998, U.S. Pat. No. 6,265,912.

BACKGROUND OF THE INVENTION

The present invention relates to a system bus called a high-speed bus for use in a microcomputer or the like.

In the high-speed bus of this kind, the realization of faster data transmission has been demanded following the speed-up in operation of a processor or the like.

Heretofore, the high-speed data transfer has been realized by connecting pull-up resistors having the same resistance value (e.g. 56Ω) to both ends of a system bus and feeding a given pull-up electric potential (e.g. 1.5V) to these pull-up resistors. One example of the high-speed bus is described in JP-A-6-35582.

However, the conventional high-speed bus is not capable of effectively suppressing ringing generated on a bus line due to change in input signal so that the data transfer rate is limited. Moreover, it can not effectively remove noise generated on the bus line, thereby to cause poor convergence of noise. This also limits the data transfer rate.

SUMMARY OF THE INVENTION

It is therefore an object of the present invention to provide a high-speed bus which can effectively suppress ringing and noise generated on a bus line so as to enable faster data transfer.

It is another object of the present invention to provide a bus receiver which is suitable for the high-speed bus.

It is still another object of the present invention to provide a bus driver which is suitable for the high-speed bus.

Other objects of the present invention will become clear as the description proceeds.

According to one aspect of the present invention, there is provided a high-speed bus which comprises a bus line to be connected with a bus driver and a bus receiver, pull-up resistors connected to both ends of the bus line for feeding a given pull-up electric potential thereto, and a series resistor connected between the bus line and each of the bus driver and the bus receiver. In the high-speed bus, the bus driver comprises a series resistor and a capacitive component which are connected in series between the bus line and a ground. The bus receiver comprises a waveform shaping component connected to the bus line for shaping a waveform of an inputted signal and a receiver circuit receiving as an input thereof an output of the waveform shaping component.

According to another aspect of the present invention, there is provided a bus receiver which comprises a receiver circuit having an input portion for being connected to a bus line and a waveform shaping component connected to the input portion for shaping a waveform of an inputted signal.

According to still another aspect of the present invention, there is provided a bus driver having an output terminal connected to a bus line for driving the bus line. The bus driver comprises a series resistor and a capacitive component which are connected in series between the output terminal and a power supply having a given electric potential.

DESCRIPTION OF THE PREFERRED EMBODIMENTS

Figure 1:
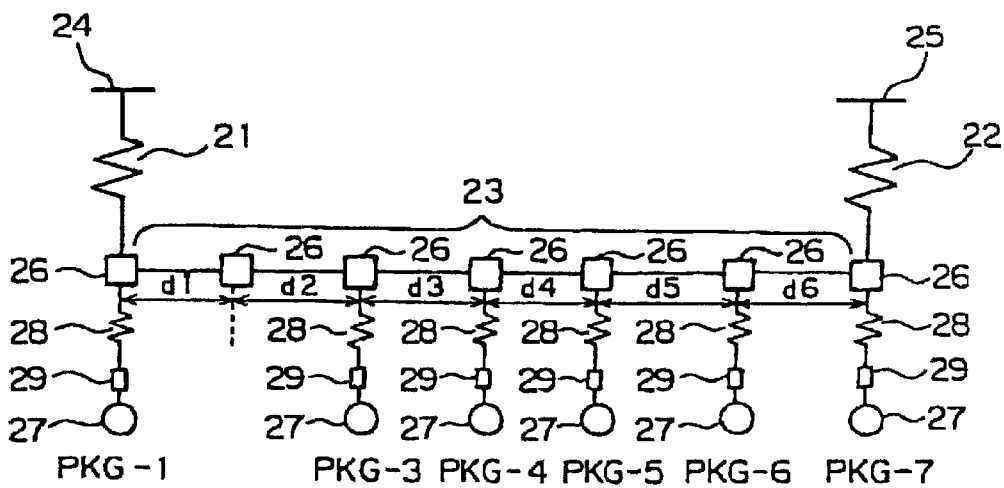
FIG. 1 is a circuit diagram showing a high-speed bus according to a first preferred embodiment of the present invention.

Referring now to FIG. 1, description will be made as regards a high-speed bus according to a first preferred embodiment of the present invention. The shown high-speed bus includes a bus line 23 having terminating resistors 21 and 22 connected to both ends thereof. Each of the terminating resistors 21 and 22 has a resistance value of 35Ω. The terminating resistors 21 and 22 are connected to pull-up power supplies 24 and 25, respectively. Each of the pull-up power supplies 24 and 25 is set to 3.3V.

To the bus line 23, a plurality of open drain buffers 27 are connected via corresponding connectors 26. Each of the open drain buffers 27 can be a driver or receiver. Between each of the connectors 26 and the corresponding open drain buffer 27, a sending-end resistor (series resistor) 28 and a stub 29 are connected. Each sending-end resistor 28 has a resistance value of 25Ω and is connected at a desired position between the bus line 23 and the corresponding open drain buffer 27. In practice, bus cards PKG-1, PKG-3, PKG-4, PKG-5, PKG-6 and PKG-7 each including the open drain buffer 27, the sending-end resistor 28 and the stub 29 are connected to the corresponding connectors 26, respectively.

The high-speed bus having the foregoing structure was actually prepared and its characteristic was measured. As the bus line 23, a standard bus was used. Distances d1, d2, d3, d4, d5 and d6 between the adjacent connectors 26 were set to 1.4 inches, 2.0 inches, 1.8 inches, 1.8 inches, 2.0 inches and 1.0 inch, respectively. As appreciated, a bus card was not connected to the second connector 26 from left. This is because the measured waveforms were most aggravated when the bus card was connected to the second connector 26. A length of each stub 29 was set to 1 inch.

Figure 2:
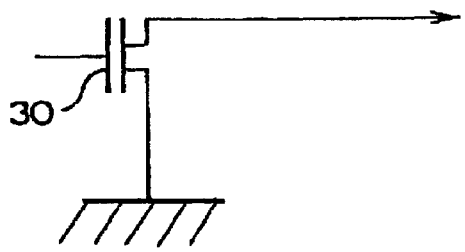
FIG. 2 is a circuit diagram showing a structure of one example of a bus driver which can be used in the high-speed bus shown in FIG. 1.

The third bus card PKG-3 from left has a conventional open drain bus driver shown in FIG. 2 as the open drain buffer 27. The bus driver shown in FIG. 2 includes a MOS transistor 30 having a source connected to the ground and a drain working as an output terminal.

Figure 3:
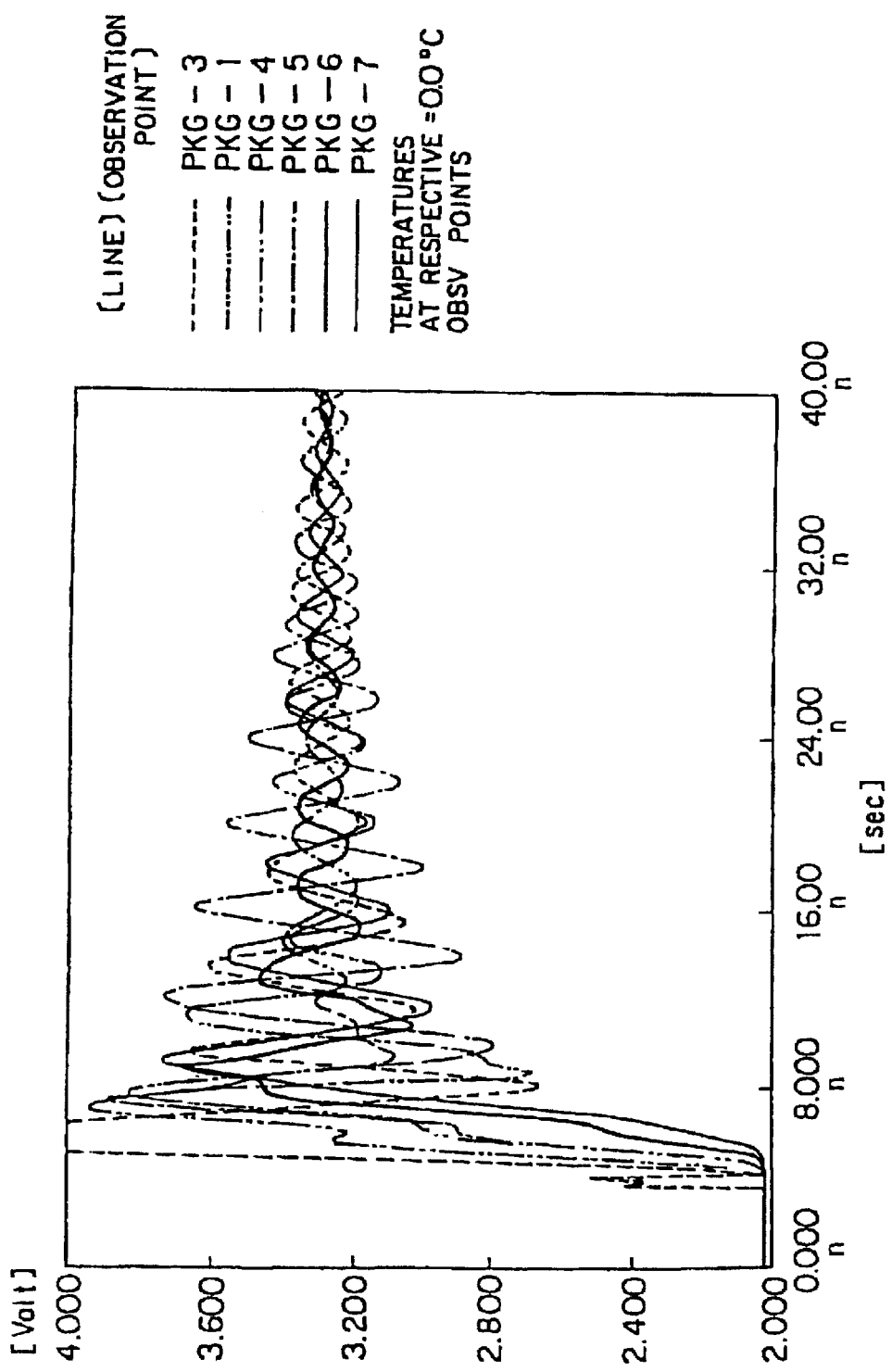
FIG. 3 is a graph showing a result of simulation on the high-speed bus of FIG. 1 driven by the bus driver of FIG. 2.

Simulation was carried out wherein a signal is sent from the bus card PKG-3 and time-domain variations of waveforms were observed at the other bus cards PKG-1, PKG-4, PKG-5, PKG-6 and PKG-7. The result was, as shown in FIG. 3, that the ringback quickly converged. Accordingly, as the ringback of the waveforms on the bus line speedily converges, the high-speed data transmission can be realized.

In the foregoing description, the resistance value of each sending-end resistor 28 is set to 25Ω, which, however, may be adjusted in the range of about ±5 W in an actual device.

Figure 4:
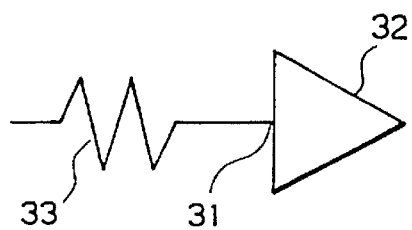
FIG. 4 is a circuit diagram showing a structure of one example of a bus receiver which can be used in the high-speed bus shown in FIG. 1.

Turning now to FIG. 4, the description will be made as regards an example of a bus receiver which can be used as the open drain buffer 27. The shown bus receiver includes a receiver circuit 32 having an input portion 31, and a resistance component 33 connected to the input portion 31 as a waveform shaping means.

Figure 5:
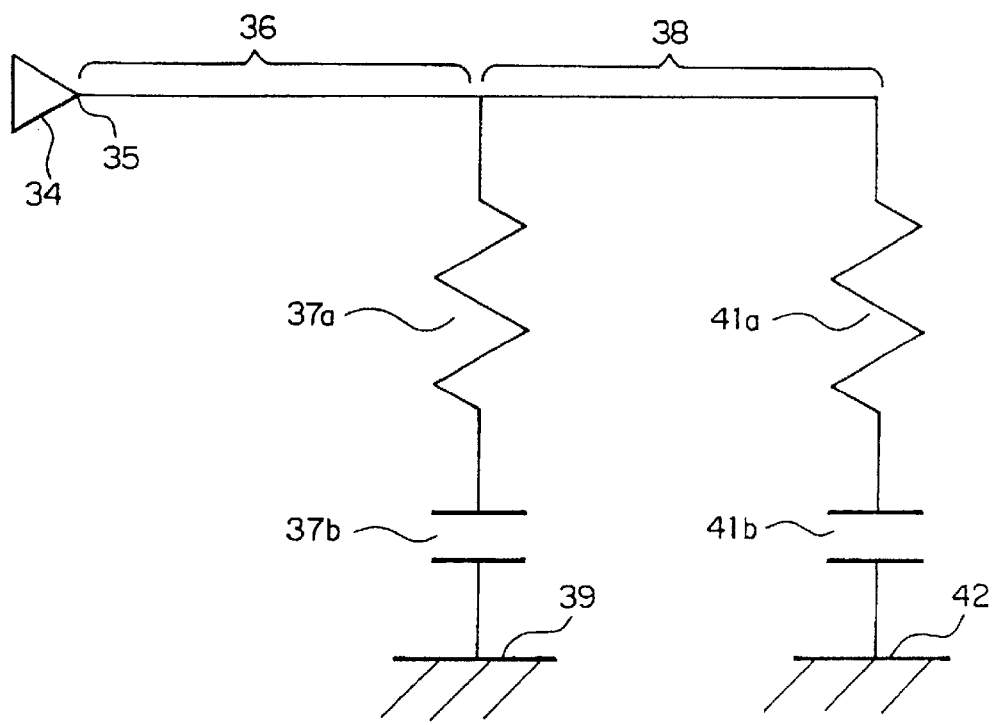
FIG. 5 is a diagram showing a circuit for confirming disturbance of waveforms associated with the bus receiver shown in FIG. 4.

Now, a circuit shown in FIG. 5 is configured for confirming disturbance of the waveforms. In FIG. 5, a driver circuit 34 has an output portion 35 to which is connected one end of a first transmission line 36 having a characteristic of a propagation delay time 1 ns at a characteristic impedance of 75Ω. The other end of the first transmission line 36 is connected to one terminal of a first resistance component 37a and one end of a second transmission line 38 having a characteristic of a propagation delay time 1 ns at a characteristic impedance of 75Ω. The other terminal of the first resistance component 37a is connected to one end of a first capacitive component 37b as a pseudo receiver circuit. The other end of the first capacitive component 37b is connected to a ground 39. The other end of the second transmission line 38 is connected to one terminal of a second resistance component 41a. The other terminal of the second resistance component 41a is connected to one end of a second capacitive component 41b. The other end of the second capacitive component 41b is connected to a ground 42.

Figure 6:
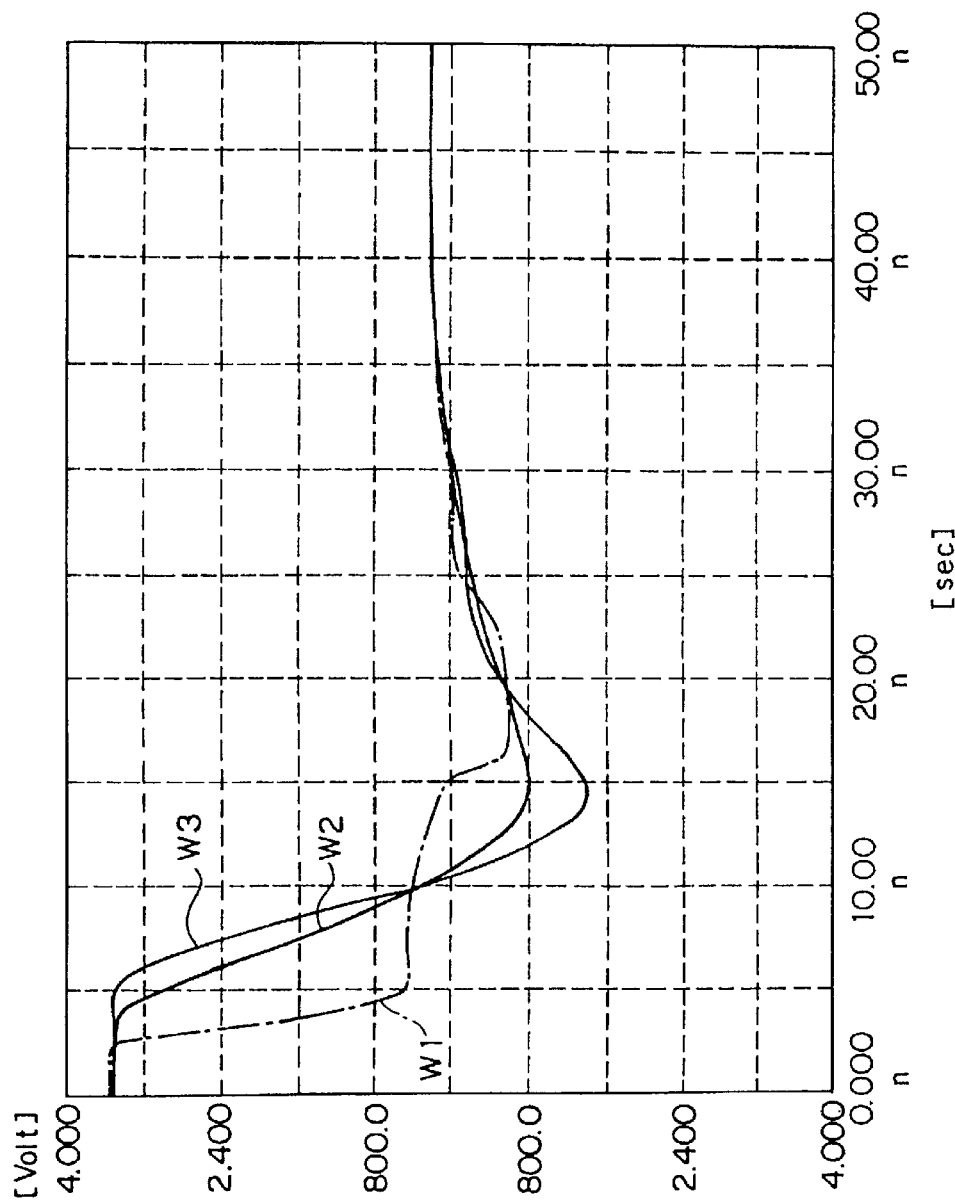
FIG. 6 is a diagram of waveform observation in the circuit shown in FIG. 5.

FIG. 6 shows trailing waveforms at respective portions of the circuit shown in FIG. 5. In FIG. 6, w1 represents a waveform at the output portion 35 of the driver circuit 34, w2 represents a waveform at the one end of the first capacitive component 37b, and w3 represents a waveform at the one end of the second capacitive component 41b.

From FIG. 6, it is confirmed that the trailing waveforms at the respective portions of the circuit have small disturbance. Accordingly, using the bus receiver shown in FIG. 4, a normal operation of the high-speed bus can be realized.

Figure 7:
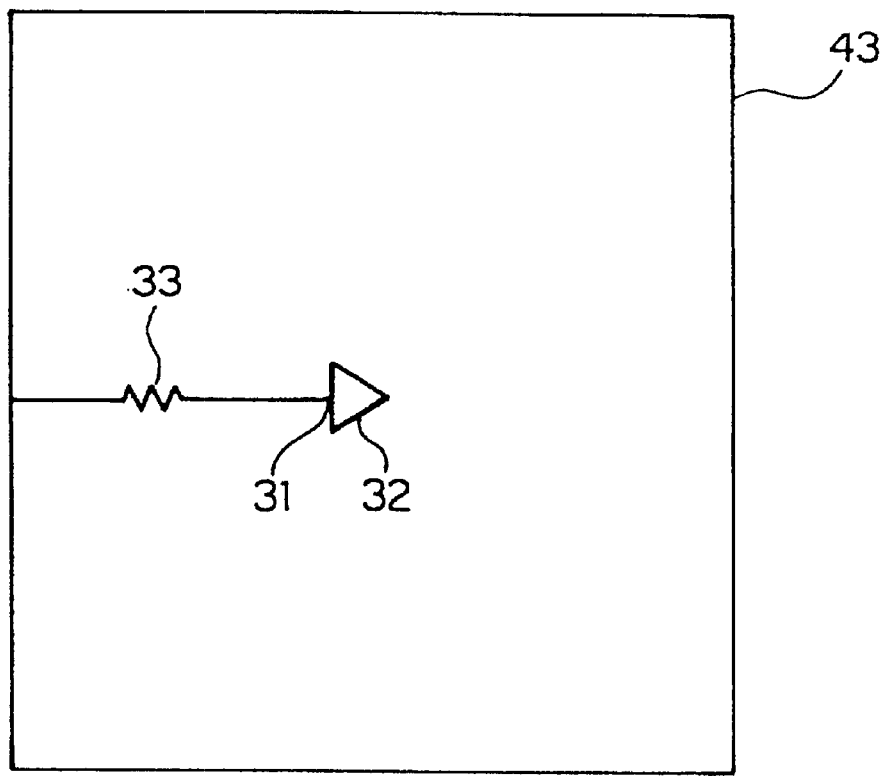
FIG. 7 is an explanatory diagram of a structure wherein the bus receiver shown in FIG. 4 is received in an LSI package.

As shown in FIG. 7, it is preferable to dispose the bus receiver of FIG. 4 in an LSI package 43. Specifically, in FIG. 7, the receiver circuit 32 and the resistance component 33 are received within the LSI package 43.

Figure 8:
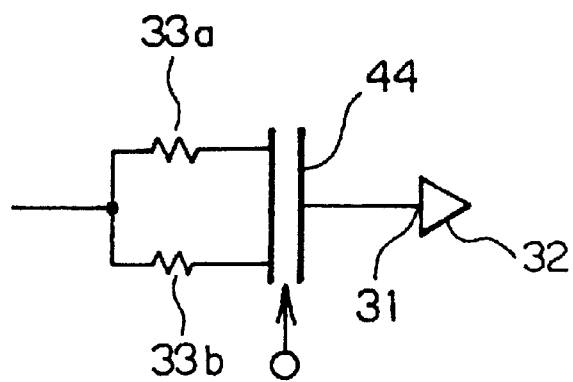
FIG. 8 is a circuit diagram showing a structure of another example of a bus receiver which can be used in the high-speed bus shown in FIG. 1.

Turning now to FIG. 8, the description will be made as regards another example of the bus receiver that can be used as the open drain buffer 27. The shown bus receiver includes a receiver circuit 32 having an input portion 31, a plurality of, i.e. first and second, resistance components 33a and 33b, and a selector 44 for selectively connecting the first and second resistance components 33a and 33b to the input portion 31 depending on an external signal. The bus receiver shown in FIG. 8 can achieve an effect similar to that achieved by the bus receiver shown in FIG. 4.

Like the bus receiver shown in FIG. 4, it is also preferable to dispose the bus receiver of FIG. 8 in an LSI package. In this case, the receiver circuit 32, the first and second resistance components 33a and 33b and the selector 44 are received within the LSI package.

Figure 9:
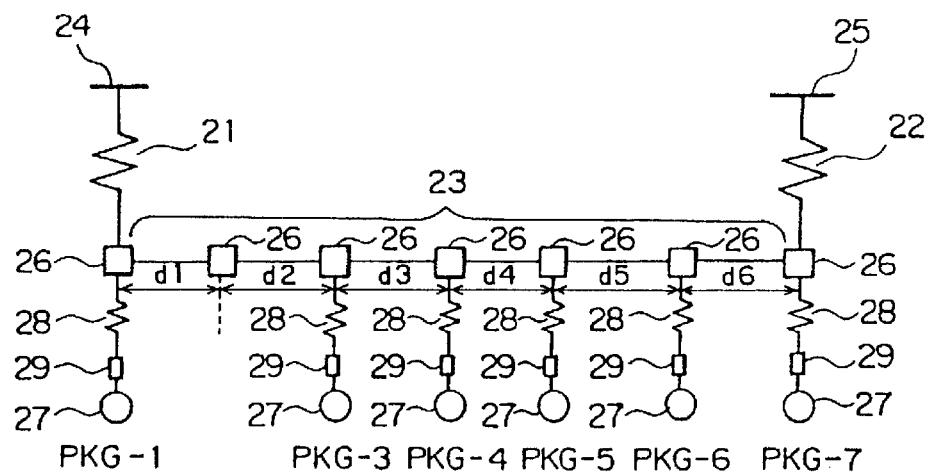
FIG. 9 is a circuit diagram showing a high-speed bus according to a second preferred embodiment of the present invention.

Referring now to FIG. 9, the description will be directed to a high-speed bus according to a second preferred embodiment of the present invention. Same or similar components are designated by same reference numeral as in FIG. 1 so as to omit explanation thereof. In the shown high-speed bus, each of terminating resistors 21 and 22 has a resistance value of 56Ω, and each of pull-up power supplies 24 and 25 is set to 1.5V.

Figure 10:
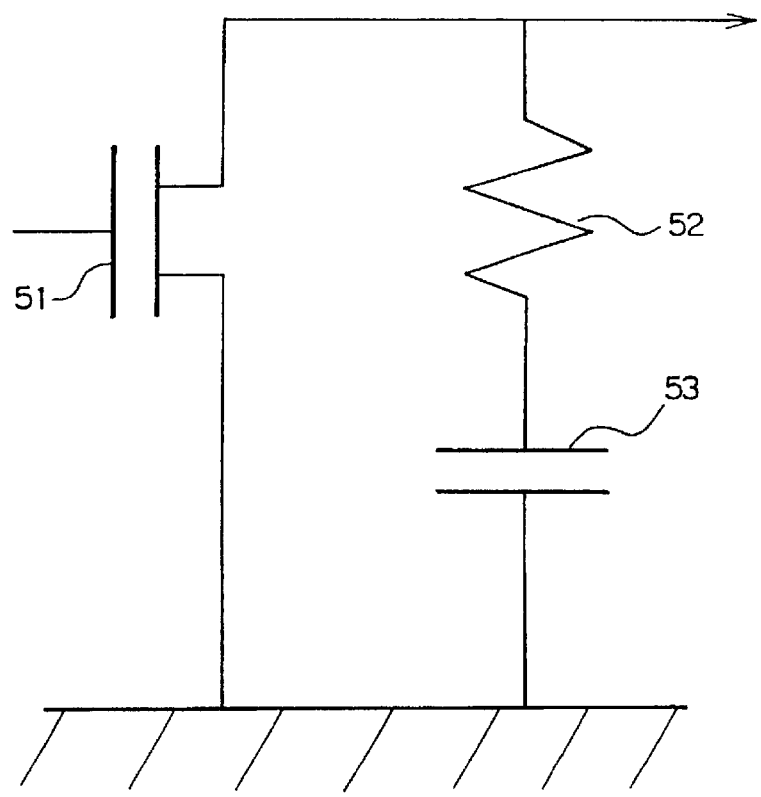
FIG. 10 is a circuit diagram showing a structure of one example of a bus driver which can be used in the high-speed bus shown in FIG. 9.

Turning now to FIG. 10, the description will be made as regards an example of a bus driver which can be used as an open drain buffer 27. The shown bus driver includes a MOS transistor 51 having a source connected to the ground, a series resistor 52 having one terminal connected to a drain of the MOS transistor 51, and a capacitive component, i.e. a capacitor 53, connected between the other terminal of the series resistor 52 and the ground. A resistance value of the series resistor 52 is set to 20Ω, and a capacitance of the capacitor 53 is set to 10 pF.

Figure 11:
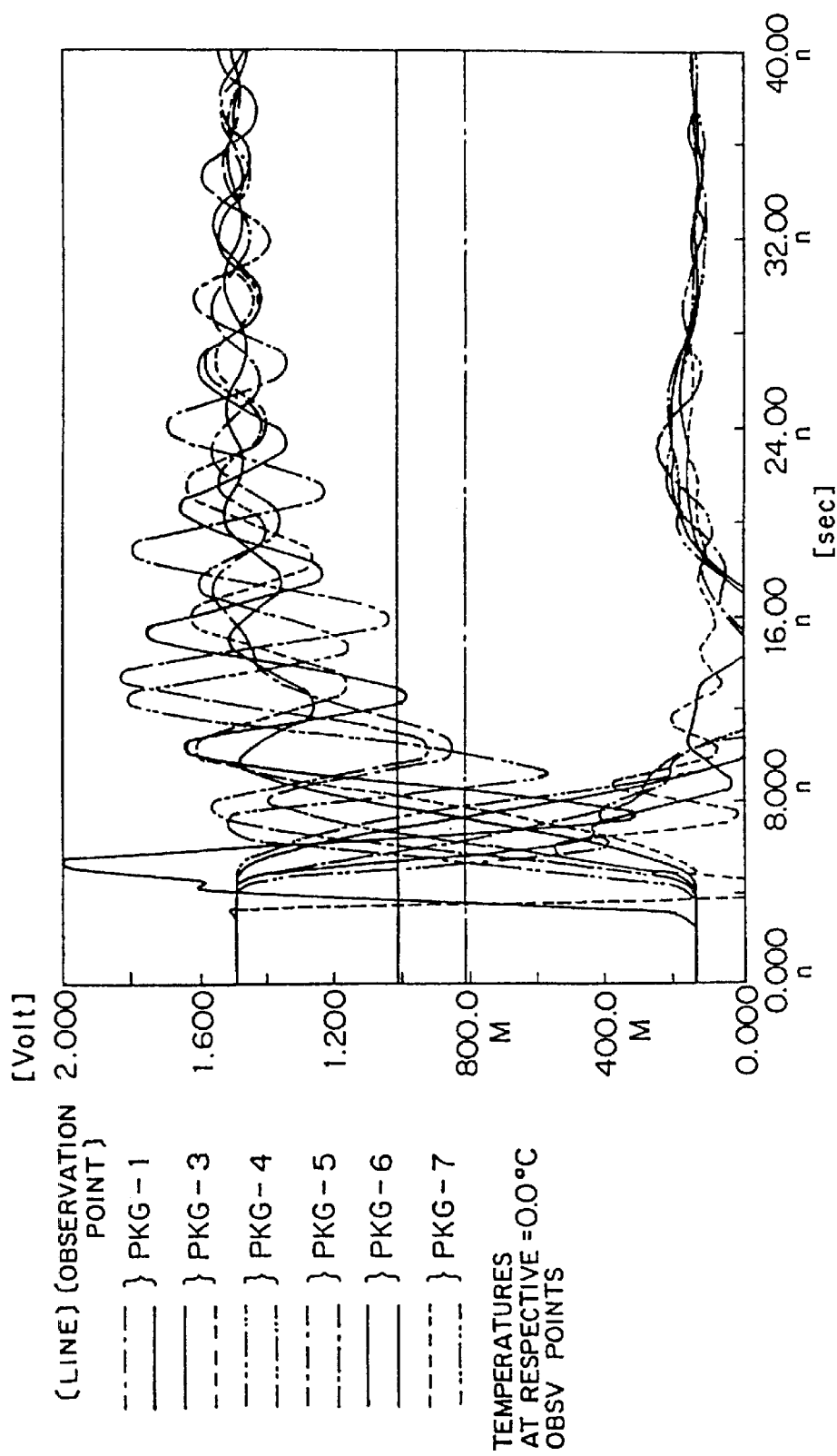
FIG. 11 is a graph showing a result of simulation on the high-speed bus of FIG. 9 driven by the bus driver of FIG. 10.

Simulation was carried out wherein the high-speed bus shown in FIG. 9 was driven using the bus driver shown in FIG. 10, and the result shown in FIG. 11 was obtained. Specifically, when a bus line 23 was driven through a third bus card PKG-3 using the bus driver shown in FIG. 10 so as to simulate time-domain variations of waveforms at the other bus cards PKG-1, PKG-4, PKG-5, PKG-6 and PKG-7, the result shown in FIG. 11 was obtained. As seen from FIG. 11, the convergence of ringback was accelerated.

As described above, since the ringback generated on the bus line can be quickly converged, the data transmission via the high-speed bus can be further accelerated.

In FIG. 10, the capacitive component 53 is directly grounded. Instead, it may be connected to a power supply which operates in an AC fashion similar to the ground. Also in this case, similar effects can be achieved.

As appreciated, in the foregoing description, the optimum values are exemplified with respect to the associated components, which may be adjusted depending on necessity in the actual circuits.

What is claimed is:

1. Apparatus including a bus and a bus driver:

said bus including:
    a bus line;
    at least one bus receiver; and
    a series resistor connected between said bus line and said bus driver and another series resistor connected between said bus line and said at least one bus receiver, said bus driver comprising:
    a transistor which inputs a signal and outputs an output signal to said bus line and along said bus line to said at least one receiver; and
    a circuit which is connected between said bus line and a power supply terminal, wherein said circuit includes a resistor and a capacitive element connected in series.

2. Apparatus as claimed in claim 1, wherein the potential of said power supply terminal is ground.

3. Apparatus as claimed in claim 1, wherein said power supply terminal comprises an alternating current.

4. Apparatus as claimed in claim 1, wherein said series resistor has a resistance value of 20 ohms, and wherein said capacitive element has a capacitance of 10 pico-farads.

* * * * *